Patented Jan. 24, 1950

2,495,305

UNITED STATES PATENT OFFICE 2,495,305

ESTERS OF PENTAERYTHRITOL DEHYDRATION PRODUCTS

Joseph A. Wyler, Allentown, Pa., assignor to Trojan Powder Company, a corporation of New York No Drawing. Application July 10, 1946, Serial No. 682,595

8 Claims. (Cl. 106—252)

This invention relates to a compound of an organic acid with an ether alcohol dehydration product of pentaerythritol. The invention relates particularly to esters of such dehydration products with drying oil fatty acids and to varnishes and like finishing compositions comprising the esters.

There have been made heretofore esters of organic acids with pentaerythritol or with its conversion products resulting from condensing pentaerythritol with the elimination of $n$ molecules of water for $n+1$ molecules of pentaerythritol condensed.

In copending application for U. S. Patent Serial No. 668,774 filed by me on May 10, 1946, for Epoxy tetramethylol methane and polymerization products thereof, and now matured into Patent No. 2,462,048 of which application the present is a continuation in part, I have described a class of compounds derived from pentaerythritol or from its said conversion products. These new compounds may be represented by the general formula:

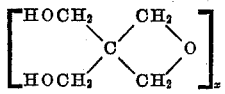

It will be noted from the formula that when $x=1$, the molecule of the monomer contains 2 alcohol (OH) groups and one ether group. This compound is called for convenience by the name epoxy tethramethylol methane, as it is related to tetramethylol methane (pentaerythritol) of the formula $C(CH_2OH)_4$ by the replacement of two of the hydroxy groups by an oxygen linked to two carbons, in a structure similar at least to that which obtains in true epoxy groups. This compound in a different system of nomenclature is 1,3-(2,2 dimethylol) propane monoxide. When X is an integral number greater than 1, then the formula above represents a polymer or conversion product of the said monoxide.

These epoxy compounds should be expected to give, with drying oil fatty acids and other organic acids, esters similar to those obtained with pentaerythritol or its conversion (condensation) products such as dipentaerythritol and tripentaerythritol. The resulting esters should be expected to be somewhat less complicated and the products less viscous when made with the dihydric alcohol as the original base material or monomer than when made with the pentaerythritol or its conversion products. These latter products contain large numbers of hydroxyl groups, 4 in the monomer, for instance, as compared to 2 in the epoxy monomer.

I have now discovered, however, that I may make more viscous esters and more effective thickening or bodying agents, as for use in paints, varnishes and finishing compositions generally, than obtained from the pentaerythritol and its conversion products.

Briefly stated, the invention comprises compounds of organic acids and particularly drying oil fatty acids with the epoxy derivatives of pentaerythritol and polymers of the epoxy derivatives. The invention comprises also finishing compositions including the said compounds along with volatile solvent therefor and suitably also with a drier of kind conventionally used in accelerating the drying of paint oils.

The effectiveness of these new products as thickening agents in linseed oil, for example, is shown most conveniently by their high viscosity in a simple solvent as, for instance, in a 50% solution in the petroleum fraction known as mineral spirits.

A representative composition, made as described later herein, with 10 hours' heating during the manufacture, shows in such 50% solution a viscosity of 1,070 centipoises. An ester made in comparable manner but with pentaerythritol as the polyhydric alcohol shows, after being heated for the same period of time and then dissolved to the same 50% concentration, a viscosity of only 200 centipoises.

The cause of the unexpected high viscosity of the product made from the epoxy derivative or dihydric alcohol, as compared to the less viscous material made from the tetrahydric alcohol which should be expected to give more complex esters, is considered to reside in the reactivity of the epoxy groups which react with pentaerythritol and its ether-alcohol dehydration products to form higher molecular weight products. In addition to the reaction of the alcohol groups with the drying oil fatty acids, in accordance with the reaction with pentaerythritol, the epoxy groups react also with drying oil fatty acids or the like. The mechanism of the epoxy group reaction is considered to be about the same as that by which ethylene oxide combines to give linear polymers with esters of fatty acids with polyhydric alcohols. The result of the epoxy groups in my new esters, therefore, is to induce a kind of polymerization which is absent in esters of the fatty acids with pentaerythritol and its usual type of conversion products.

As the dehydration product of pentaerythritol for use in making compounds of the present invention, there is used one of the epoxy compounds represented by the formula above. The epoxy derivative is made as described in the copending application.

Water is first eliminated from pentaerythritol by warming with sulfuric acid, phosphoric acid or like condensation accelerator. The product so obtained, which will be a mixture of epoxy material and unchanged pentaerythritol and polypentaerythritol condensation products thereof, is then subjected to treatment to separate the epoxy material or its polymers from the pentaerythritol condensation products.

This treatment in the preferred method involves separation of alcohol-soluble material by treatment with alcohol followed by dehydration and crystallization of the product.

In another embodiment the method includes concentrating an aqueous solution of the product first formed by the acid treatment of the pentaerythritol compound, continuing the concentration almost to the point of crystallization, and then adding a volatile liquid that is not a solvent for the epoxy compound, as, for example, butanol, distilling the mixture, separating the condensate into an aqueous and non-aqueous layer, and returning the non-aqueous layer to the still until substantially all the water is removed. There results a suspension of crystals of pentaerythritol, its condensation products and the epoxy compounds in the liquid. When boiling is discontinued, the crystals of the penta compounds settle rapidly whereas the crystals of the epoxy compounds settle slowly. The suspension of the slowly settling epoxy compounds is then decanted away from the crystals of the penta compound. The crystals of the epoxy compounds so separated may then be further purified by recrystallization as from hot water.

Compounds made as described are considered to have the general structure shown in the following formula:

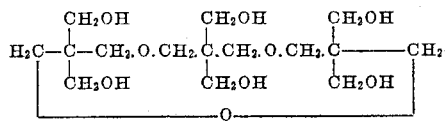

in which X=one or any whole number. For the trimer X=1 and for the pentamer X=3. For the heptamer X=5.

The method will be further illustrated by detailed description in connection with the following specific examples.

EXAMPLE 1

*Preparation of trimer of epoxy-tetramethylol methane*

Pure pentaerythritol was heated with 0.2% of its weight of sulfuric acid with the liberation of water, until the OH content of the product was about 37%.

100 parts of this product were refluxed with 400 parts of ordinary commercial ethyl alcohol for about 2 hours and the hot mixture filtered. The filtrate was evaporated to dryness on the steam bath, taken up in hot water, decolorized by means of charcoal, filtered, and this filtrate placed in a suitable still and evaporated to small volume.

Just before any crystals are caused to separate during the evaporation, normal butyl alcohol is added in a steady stream in order to effect an azeotropic distillation, to dehydrate the mixture and to cause the separation of clean-cut crystals. By this procedure coarse crystals of pure pentaerythritol (unconverted in the original heating process) and fine crystals of the trimer of epoxy-tetramethylol methane separate. The latter crystals are readily separated by decantation from the denser crystals of pentaerythritol, as by stirring the whole mixture and pouring off the suspended crystals as soon as the larger crystals have settled.

50 parts of this fine material were dissolved in 200 parts of hot water, the mixture cooled to room temperature and the crystals which form filtered off, washed and dried.

The trimer, epoxy-tetramethylol methane, is a white pulverulent, crystalline product of M. P. about 208° C., somewhat soluble in ethyl alcohol, but less soluble in butyl alcohol, slightly soluble in cold water but more soluble in hot. It is more soluble in water containing some pentaerythritol than it is in pure water and appears to become somewhat hydroxylated upon prolonged heating in water. It is soluble in hot diethylene glycol and may be precipitated therefrom by means of ethyl alcohol or cold water.

Its formula may be written:

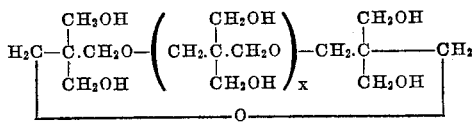

EXAMPLE 2

*Preparation of the pentamer of epoxy-tetramethylol methane*

Pure pentaerythritol was heated with 0.2% of its weight of sulfuric acid, with the liberation of water, to obtain a conversion product containing 38.05% OH. One part of this product was mixed with 14 parts of water and the mixture boiled for about one half hour. The hot (90° C.+) mixture was filtered away from undissolved material and the clear filtrate allowed to cool to room temperature. The flocculent precipitate which formed was filtered off, washed with water, dried and pulverized.

The purified product contains no ketonic or aldehydic groups and was found to be the pentamer.

EXAMPLE 3

*Preparation of the heptamer of epoxy-tetramethylol methane*

Pure pentaerythritol was heated with 0.2% of its weight of sulfuric acid, with the liberation of water, to obtain a conversion product of OH content about 30%, say 28% to 32%.

One part of this product was mixed with 14 parts of water and the mixture boiled for about one-half hour. The hot (90° C.+) mixture was filtered and the residue repeatedly treated with boiling water and filtered at a temperature above 90° C., until a test of the clear filtrate indicated practically no hot water soluble material left in the residue. This repeated boiling in water removes the lower polymers which are relatively more soluble than the higher which are practically insoluble in water but soluble in hot glycerine or diethylene glycol from which they may be precipitated by means of ethyl alcohol, methyl alcohol, or water.

In the present example, in which a 30% OH conversion product was initially used, the final insoluble fraction obtained above was found to be the heptamer.

The derivative selected for use in making the new compounds described herein should contain about 26 to 32% of hydroxyl groups. If the epoxy compound has a hydroxyl content much less than 26%, the compounds or resins made therefrom by reaction with the organic acids as described, will be seen to contain insoluble gels or stringy masses when the product is made up with toluol, mineral spirits, naphtha, or like solvent thinner. When, on the other hand, the hydroxyl content is substantially above 32%, the resins made as described herein will not body as rapidly as desired when warmed in drying oil compositions.

As the organic acid which is combined with the epoxy derivative, there are used to advantage linseed oil fatty acids, soya bean fatty acids, talloil, and abietic acid, say in the form of rosin, these acids being used either alone or mixed with each other. When the combination of strong thickening and brushability of a solution of the product is not required, then there may be used other acids for reaction with the epoxy compounds as, for example, sebacic or maleic acid. When drying properties also are not required in the particular use to which the ester of the present invention is to be put, then the acid used may be benzoic, phthalic, terephthalic, or like acid.

In general the selected epoxy derivative of the kind shown, either in monomeric or polymeric form, is mixed with the selected acid or acids and the whole is heated in such manner as to cause escape of the water formed in the reaction, the removal of water being suitably promoted by bubbling through the heated mixture a stream of inert gas of which carbon dioxide or nitrogen are representative and convenient ones to use.

The temperature of the heating is at least that at which the rate of reaction with the formation of water and its subsequent expulsion by evaporation is satisfactorily rapid for commercial operation but below the temperature of objectionable decomposition or darkening of the reactants or the product of their reaction. Thus the temperatures used may be between 100° and 300° C., although temperatures should not be much above 290° if a reasonably light colored product is required. Actually I prefer to use temperatures of about 250° to 295° C. The rate of reaction at 250° C. is rapid and a final temperature of 290° C., or very slightly above for a short time, may be used at the end of the reaction with results that are satisfactory for most purposes.

The period of heating is that which is shown by test of the product to give the desired viscosity after the product is dissolved in the test solvent such as an equal weight of mineral spirits. Ordinarily I use 6 to 10 hours' heating. In accordance with the viscosity desired, I may, however, use a shorter time, say a time sufficient to lower the acidity by the reaction to that permissible in the composition in which the product is to be used. Also the time of heating may be lengthened but, in the manufacture of a material for use in a varnish or like finishing composition, the period should be at least short of that which if used causes gelling of the product. Making a few trial runs or following the progress of the reaction by removing specimens and testing for viscosity will show how to avoid both over and under heating of the batch.

As to proportions of the materials, I use the epoxy derivatives of tetramethylol methane in proportion preferably about equivalent to the glycerine conventionally used in making resins with the selected organic acid. Using the dihydric epoxy monomer, for instance, I use to advantage ½ mol in esterification reactions in which ⅓ mol of the trihydric glycerine has been previously used.

I may use an excess of the epoxy compound as compared to the fatty acid so as to make a mono or other ester containing unreacted hydroxy group. An example of such product is that represented by the following formula

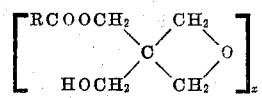

In this formula, as elsewhere herein, R represents a monovalent hydrocarbon radical, as, for example, the $C_{17}H_{33}$— group of oleic acid, the $C_{17}H_{31}$— group of linoleic acid, or the $$(CH_3)_2CH(CH_3)_2C_{14}H_{16}—$$

group of abietic acid, and $x$ is an integral number within the range 1 to 7 and preferably 1, 3, 5 or 7.

Using a proportion of the organic acid equivalent to or in excess of the epoxy compound, I make a product of the general formula

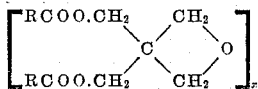

Using a dicarboxylic acid of which sebacic and phthalic are examples and using the acid in proportion equivalent to or in excess of the epoxy compound I make a product of the type formula

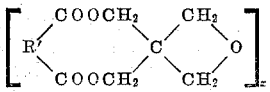

In this formula R' is a bivalent hydrocarbon group such as $C_6H_4=$, $(CH_2)_8=$, or $(CH_2)_2$, these being the hydrocarbon radicals of phthalic, sebacic and maleic acids, respectively.

The making and significant properties of the compounds of the present invention will be illustrated in greater detail in connection with the following specific examples.

In these examples and elsewhere herein proportions are expressed as parts by weight unless otherwise specifically stated.

EXAMPLE A

Talloil of the commercial grade known as Unitol in the proportion of 39.6 parts, rosin of grade w. w. 16.3 parts, and linseed oil fatty acids 32.6 parts were mixed thoroughly in a reaction kettle and warmed to give a molten mass. During the warming a stream of carbon dioxide gas was bubbled through the mixture at a rather rapid rate, to carry off any water present originally or formed. When the temperature of the whole reaches 260° C. there were added slowly and with constant stirring 11.5 parts of an epoxy pentaerythritol of hydroxyl content 30%, this product having been made by the dehydration of pentaerythritol as described in my copending application and with phosphoric acid as the acid dehydration catalyst.

The period of time required to bring the mixture to 260° C. and introduce the epoxy derivative was approximately one hour.

In addition to this hour of warming up, the mixture was heated for 10 hours more with continuance of the passage of the stream of gas.

During this treatment, the acid number fell and the viscosity rose as shown in the following table:

| Time of Heating | Acid Number | Viscosity of 50% Solution in Mineral Spirits, C. P. S. |
| --- | --- | --- |
| 6 hrs | 21.8 | 75 |
| 7 hrs | 19.1 | 90 |
| 8 hrs | 17.5 | 160 |
| 10 hrs | 15.2 | 1,070 |

(By contrast, material made similarly but from pentaerythritol as the polyhydric alcohol had a viscosity after 10 hours heating of 200 c. p. s. Also a product made similarly from a converted or condensed pentaerythritol of hydroxyl content 35.5% after 10 hours' heating had a viscosity of 370 c. p. s.)

EXAMPLE B

The procedure of Example A was followed except that the proportions of materials used were as follows:

|  | Parts |
| --- | --- |
| Talloil | 38.8 |
| Rosin | 16.0 |
| Linseed oil fatty acids | 32.0 |
| Epoxy P. E. (25.7% OH) | 13.2 |

After 6½ hrs.' heating this product in 50% solution in mineral spirits had a viscosity of 200 c. p. s. After heating for 8½ hours, it showed the presence of some particles of gel. These were filtered out.

EXAMPLE C

The procedure of Examples A or B is followed except that the mixed acids there used are replaced by an equivalent weight of linseed oil fatty acids, soya bean oil fatty acids, abietic acid, benzoic acid, phthalic acid, sebacic acid, or maleic acid used alone or mixed with each other.

EXAMPLE D

The procedure of Examples A–C is followed except that the organic acids used in those examples are replaced wholly or in part by an ester of the fatty acid. Linseed oil or other drying oil is heated, for example, with the epoxy compound in the proportion of 0.1 to 5 and preferably about 0.2 part for 100 parts of the drying oil.

The products of the invention are resins and at elevated temperatures are viscous oils, are soluble in hydrocarbon type solvents, and, when mixed in even small proportions with drying oil fatty acids, show a satisfactory rate of drying in the presence of air, particularly when compounded with a paint oil drier.

My new products are useful in making varnishes. In this case, the products are dissolved in a usual varnish thinner of which V. M. and P. naphtha, mineral spirits, or toluol are good examples and are compounded with a drier of conventional kind and in usual proportion for accelerating the oxidation of paint oils. Thus, lead or cobalt linoleate or oleate may be incorporated in the proportion of 0.2% or so of the drier on the weight of the non-volatile ingredients of the varnish. When it is desired to make a colored finishing composition, then conventional pigments are incorporated to establish the desired color.

My new products, the compounds of the organic acids with the epoxy derivatives of pentaerythritol, may be used also as a bodying agent for drying oils. Thus, any one of the new compounds described herein may be incorporated say in proportion equivalent to 0.1 to 5 parts of the original epoxy compound for 100 parts of the linseed, soya bean, perilla, oiticica or like drying oil, the result being a pronounced thickening of the oil. When used in the proportion of 0.1 to 0.3 part, the epoxy compounds give an improvement in color of linseed oil of about 2 in the Gardner-Holt color scale when the original color of the oil to be bodied is 6 or more. The explanation is considered to be the reactivity of the epoxy group in the finished compound with the color producing agents present in the oil. The ester that serves to lighten the color, as well as to body the oil, may be formed in situ. Thus the colored linseed oil may be mixed with 0.1 to 0.3% of its weight of the epoxy compound and the whole heated to the reaction temperature, say to about 560° to 585° F.

The content of hydroxyl groups in the originally used epoxy compound may be found by analysis of the finished esters described herein. The esters are saponified and the resulting epoxy compound isolated and analyzed for percentage of hydroxyl groups, C, H, and O (by difference) and molecular weight determination is made.

It will be understood also that it is intended to cover all changes and modifications of the examples of the invention herein chosen for the purpose of illustration which do not constitute departures from the spirit and scope of the invention.

What I claim is:

1. The ester of an organic acid with the dehydration product of pentaerythritol of composition represented by the type formula

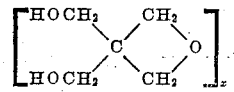

in which $x$ is an integral odd number within the range 1–7 and containing ether and alcohol groups in the ratio of 1 ether group to 2 alcohol groups.

2. The esters of drying oil fatty acids with the dehydration product of pentaerythritol of composition represented by the type formula

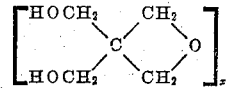

in which $x$ is an integral odd number within the range 1–7 and containing ether and alcohol groups in the ratio of 1 ether group to 2 alcohol groups.

3. The compound of an organic acid with a dehydration product of pentaerythritol, the compound containing ester and ether groups and being of the composition represented by the type formula

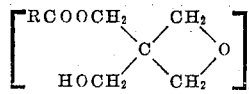

R in the formula representing a monovalent hydrocarbon radical and $x$ representing an integral odd number within the range 1 to 7.

4. The compound of an organic acid with a dehydration product of pentaerythritol, the compound containing ester and ether groups and being of the composition represented by the type formula

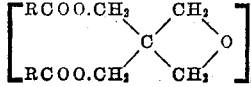

R in the formula representing a monovalent hydrocarbon radical and $x$ representing an integral odd number within the range 1 to 7.

5. The compound of an organic acid with a dehydration product of pentaerythritol, the compound containing ester and ether groups and being of the composition represented by the type formula

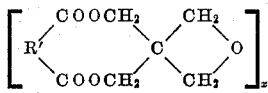

R' in the formula representing a bivalent hydrocarbon radical and $x$ representing an integral odd number within the range 1 to 7.

6. As a new compound the linoleate of the ether-alcohol dehydration product of pentaerythritol, the compound being of the formula

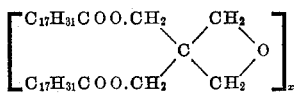

$x$ representing an integral odd number within the range 1 to 7.

7. A varnish consisting essentially of the esters described in claim 2, a drier, and a solvent for the ester.

8. A drying oil composition consisting essentially of a colored linseed oil and esters of the kind described in claim 2, the said esters being used in the proportion of about 0.1 to 0.3 part, calculated as the said dehydration product before esterification, for 100 parts of the oil, the said esters increasing the viscosity of the oil and decreasing the color.

JOSEPH A. WYLER.

REFERENCES CITED

The following references are of record in the file of this patent:

UNITED STATES PATENTS

| Number | Name | Date |
|---|---|---|
| 2,298,186 | Woodhouse | Oct. 6, 1942 |
| 2,366,738 | Loder | Jan. 9, 1945 |
| 2,381,883 | Brubaker | Aug. 4, 1945 |
| 2,390,202 | Burrell et al. | Dec. 4, 1945 |
| 2,401,749 | Burghardt | June 11, 1946 |